Nov. 6, 1928.

C. L. WOLFE ET AL 1,690,264

AUTOMATIC DOOR CLOSING AND LOCKING DEVICE

Filed July 18, 1923     5 Sheets-Sheet 1

Inventors
Clinton L. Wolfe and
Joseph A. Jarrot
By Knight & Bros
Attorneys.

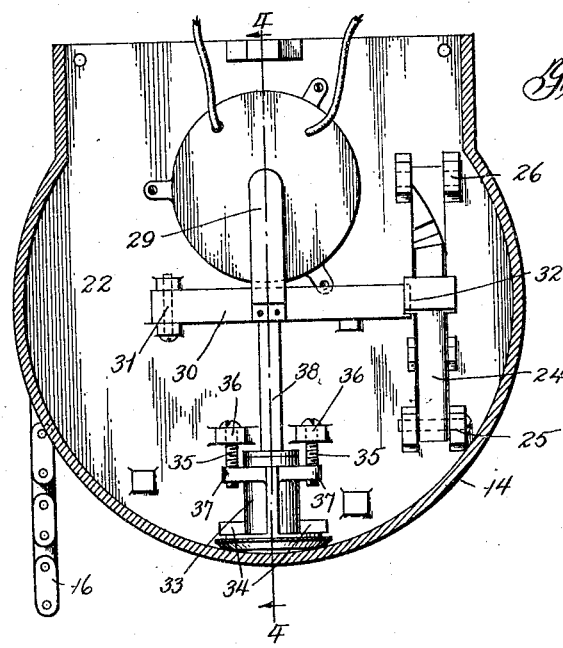
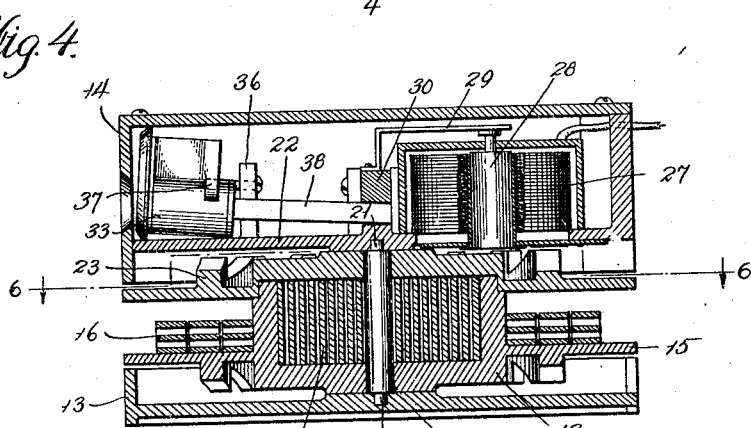
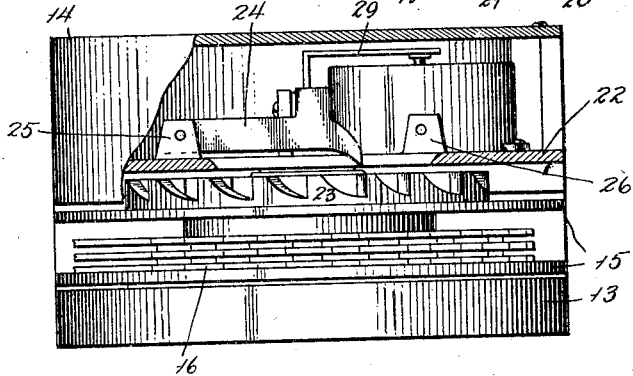

Nov. 6, 1928. 1,690,264
C. L. WOLFE ET AL
AUTOMATIC DOOR CLOSING AND LOCKING DEVICE
Filed July 18, 1923   5 Sheets-Sheet 3
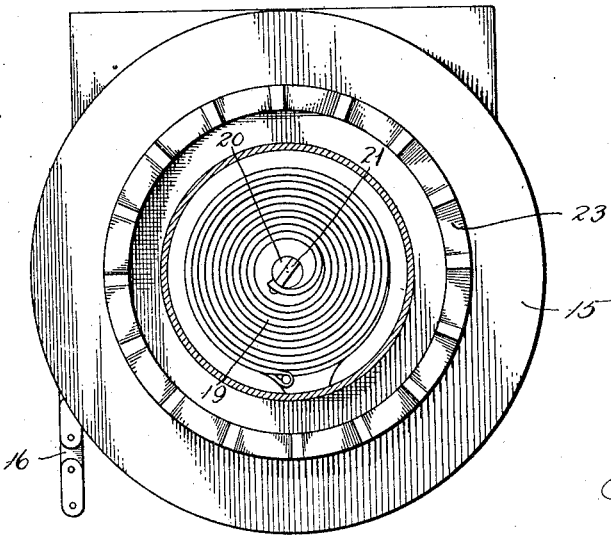
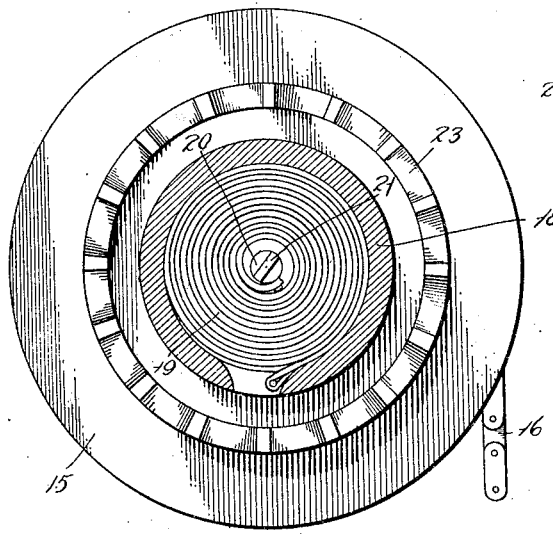
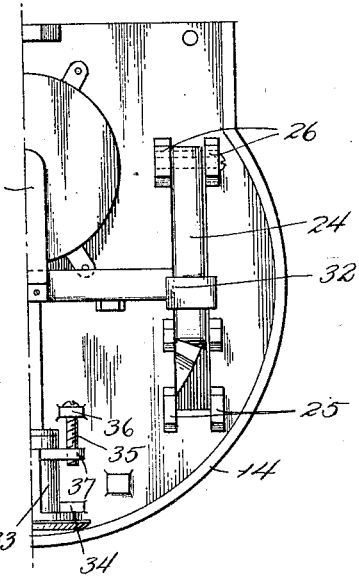

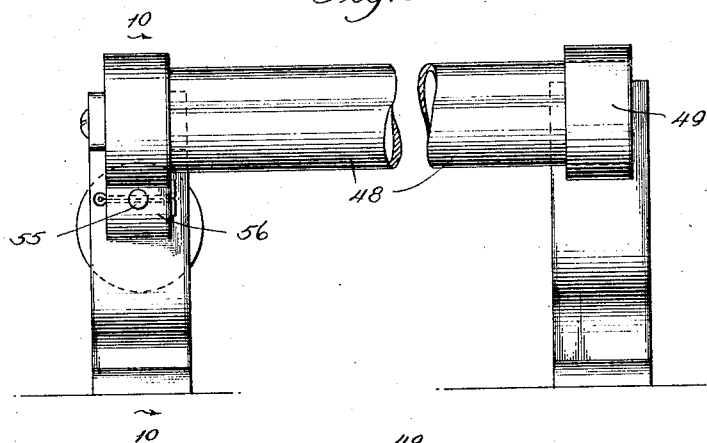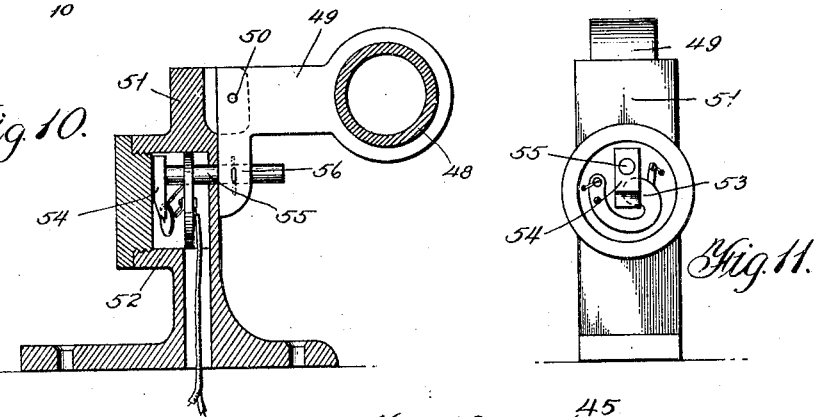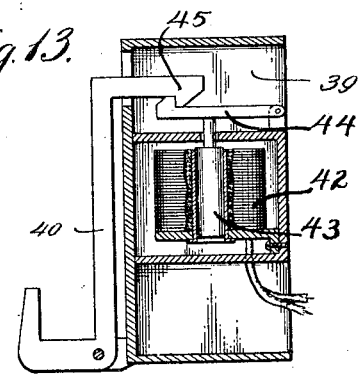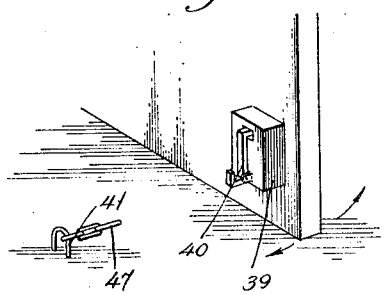

Nov. 6, 1928.

C. L. WOLFE ET AL 1,690,264

AUTOMATIC DOOR CLOSING AND LOCKING DEVICE

Filed July 18, 1923   5 Sheets-Sheet 5

Inventors
Clinton L. Wolfe and
Joseph A. Faust

By Knight Bros.
Attorneys

Patented Nov. 6, 1928.

1,690,264

UNITED STATES PATENT OFFICE.

CLINTON L. WOLFE, OF BROOKLYN, AND JOSEPH A. FAUROT, OF NEW YORK, N. Y.

AUTOMATIC DOOR CLOSING AND LOCKING DEVICE.

Application filed July 18, 1923. Serial No. 652,434.

This invention relates to an automatic door closing and locking device and is particularly adapted for use in connection with the doors of banks, pay cars, cashiers' cages and other buildings and institutions where securities and valuables are contained.

One of the objects of this invention is to provide an automatically controlled door closing and locking device which will be efficient and positive in its operation and so arranged that the same may be operated electrically, employing distant control means embodying a plurality of circuit closing devices conveniently disposed at a plurality of strategical points.

The invention further contemplates the provision of alarms which are operatable when the doors are closed whereupon it is necessary only to actuate one of the controlling devices whereupon the doors of the bank or other institution will automatically close at the same time sounding an alarm for the purpose of calling assistance.

Figure 1:
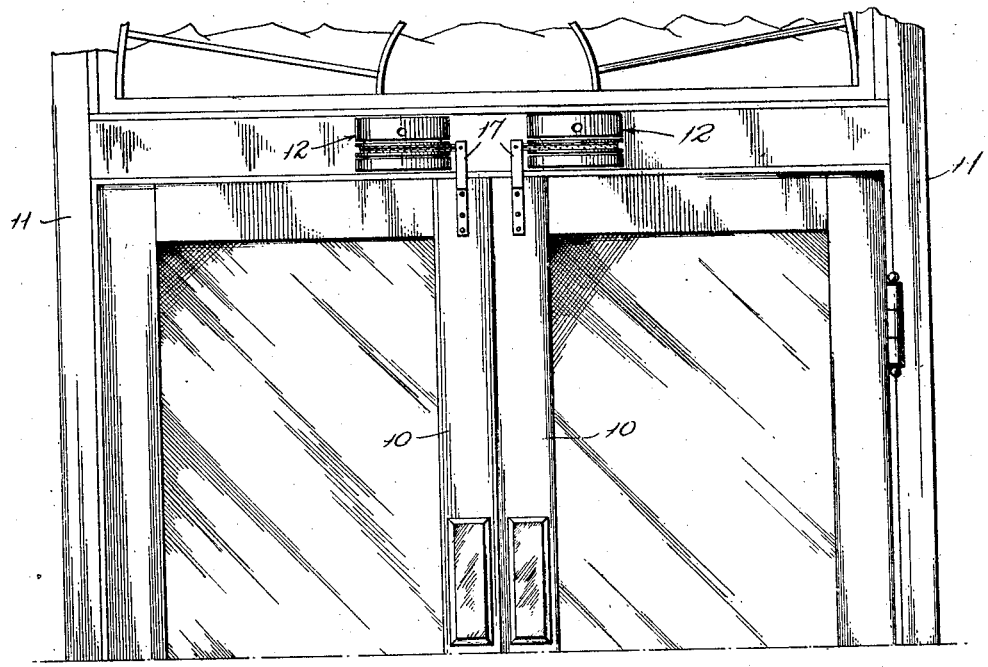
Figure 2:
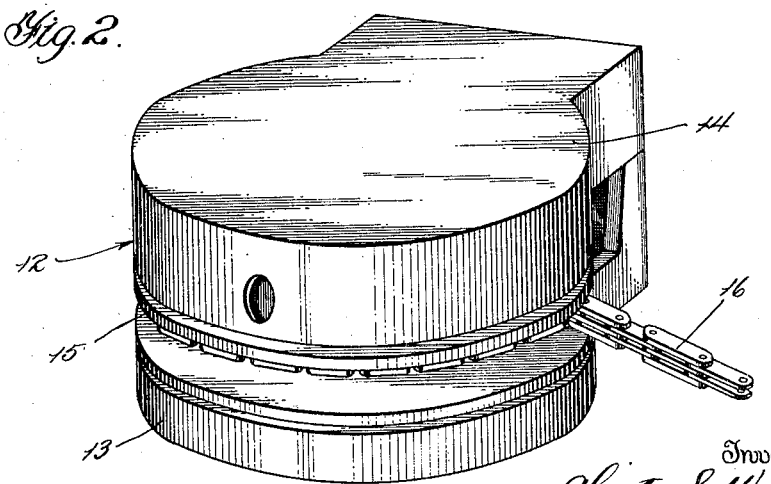
Figure 15:
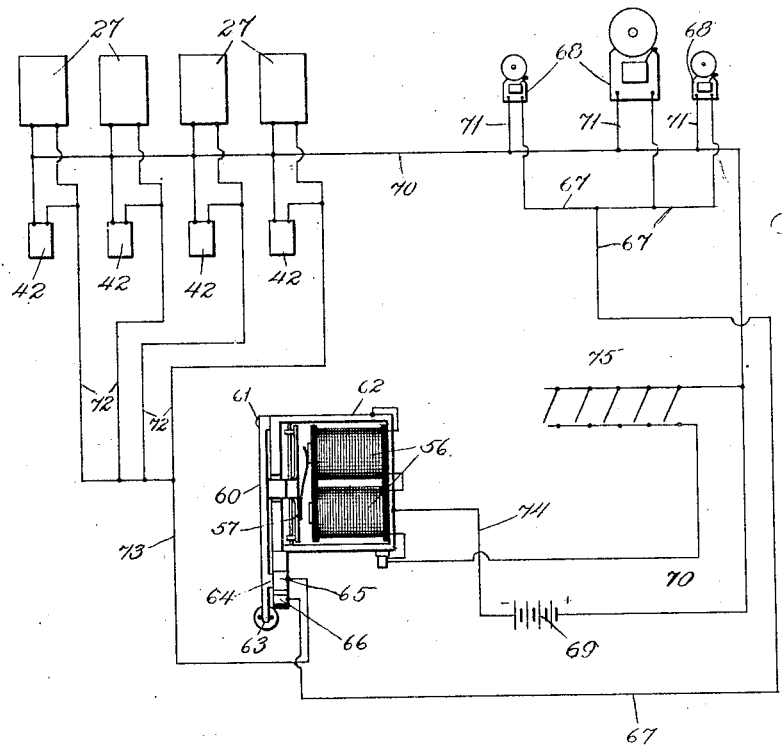
Figure 14:
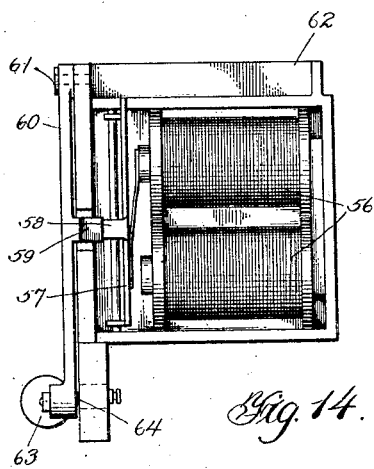

Other objects as well as the advantages incident to our improved arrangement will be made more apparent as this description proceeds especially when considered in connection with the accompanying drawings wherein:

Fig. 1 is a fragmentary elevation of a pair of doors with a portion of our improved locking means applied thereto, Fig. 2 is a perspective view of one of the main door controlling members, Fig. 3 is a plan view of one of the door controlling members with the cover removed, Fig. 4 is a sectional view taken substantially on the plane indicated by line 4—4 in Fig. 3, Fig. 5 is a front elevation of one of the door controlling members, partly in section, Fig. 6 is a sectional view taken substantially on the plane indicated by line 6—6 in Fig. 4, Fig. 7 is a similar sectional view with the ratchet member reversed, Fig. 8 is a fragmentary plan view similar to Fig. 3 showing the dog in reversed position corresponding to the position of the ratchet illustrated in Fig. 7, Fig. 9 is a fragmentary elevational view of one form of a circuit closing device, Fig. 10 is a sectional view taken on the plane indicated by line 10—10 in Fig. 9, Fig. 11 is a rear elevation of the structure illustrated in Fig. 10 with a part removed to show the interior construction, Fig. 12 is a fragmentary perspective view showing means for securing the door in open position, Fig. 13 is a sectional view through the door holding means illustrated in Fig. 12, Fig. 14 is a view of a relay circuit breaker and alarm controlling device, and Fig. 15 is a diagrammatic view of one wiring arrangement which might be employed.

Referring now more particularly to the drawings wherein like reference characters indicate like parts, it will be noted that we have illustrated a pair of doors 10 suitably hinged to a door frame 11. Our improved arrangement contemplates means for automatically closing these doors and for securing them in closed position.

For accomplishing this we provide a pair of door closing members indicated generally by the reference character 12. Each of the members 12 comprises a base or bottom 13 forming with a removable cover 14 a casing designed to enclose most of the operating parts. Interposed between the base 13 and cover 14 is a pulley member 15 adapted to have wound thereon a chain 16, the free end of which is connected to a bracket 17 secured to the door.

Each pulley wheel consists of a hollow hub 18 providing means for housing a coil spring 19, one end of which is connected to the pulley hub while the other end is connected to a stub shaft or axle 20. The stub shaft 20 is provided with squared ends 21 fitting into similarly shaped openings formed in the bottom or base 13 and a supplemental partition 22 extending across the cover 14. In this manner the shaft 20 is prevented from rotating while the pulley member 15 is mounted to rotate upon this shaft, its rotation in one direction being influenced by the tension of the coil spring 19. The direction of rotation of the pulley 15 tends to wind thereon the chain 16 for the purpose of closing the doors 10 as will be obvious.

On each face of the pulley 15 is a circumferential row of ratchet teeth 23 adapted to cooperate with a dog 24 pivoted to either of a pair of studs 25 or 26 projecting upwardly from the supplemental partition 22 of the cover 14. The dog 24 is pivoted to the pair of studs 25 when the pulley member is in the position illustrated in Figs. 4, 5 and 6, but when the pulley member is reversed as illustrated in Fig. 7 the dog 24 will be pivoted to the pair of lugs 26. In this manner the same door controlling member 12 may be used for closing and locking either of a pair of doors 10 which normally swing in opposite directions. In Fig. 8 the dog 24 is shown pivoted to the pair of lugs 26 whereby it is in position to effectively cooperate with the ratchet teeth 23 of the pulley member 15 which is shown in its reversed position in Fig. 7.

The dog 24 is pivoted so as to normally drop by gravity into effective engagement with the ratchet teeth 23 and when in its lower position it prevents a retrograde rotation of the pulley or in other words, a rotation of the pulley which would permit an opening of the doors 10. However the angle of the ratchet teeth is so arranged that after the dogs have dropped by gravity into engagement therewith these dogs will slide over the ratchet teeth to permit the rotation of the pulley members in a direction to wind thereon the chains for the purpose of closing the doors 10.

For maintaining the dogs 24 in their upper position we associate with each of the members 12 a solenoid 27 having a movable core 28 which engages an arm 29 secured to a latch member 30 pivoted as at 31 to the supplemental partition 22 of the cover. The dog 24 is provided with a laterally extending offset 32 under which the free end of the latch 30 is adapted to engage. Obviously if the solenoid 27 is kept energized the core 28 thereof will be held in its extended position in engagement with the arm 29 thus maintaining the latch 30 in a raised position whereby it engages the projection 32 of the dog 24 for maintaining the dog in a raised position out of engagement with the ratchet teeth 23 of the pulley member as clearly illustrated in Fig. 5.

The solenoids 27 are therefore preferably included in a closed circuit by which they are maintained energized thus keeping their cores in extended position and maintaining the dogs 24 out of engagement with the ratchet teeth. Obviously therefore if the circuit to the solenoid 27 is broken the core 28 thereof will move downwardly thus releasing the latch member 30 and permitting the dog 24 to drop by gravity into engagement with its associated ratchet teeth 23. In the event it is necessary or desirable to safeguard against an accidental or unintentional operation of the device due to short circuit or otherwise, we provide key actuated locking means for maintaining the dogs 24 out of engagement with their associate ratchet teeth. This locking means is illustrated particularly in Figs. 3 and 4 wherein there is shown a key actuated locking cylinder 33 held rigidly against a pair of studs 34 by means of bolt 35 which pass through studs 36, and screw-threadedly engage lugs 37 formed on the locking cylinder. Upon the insertion of a proper key into the locking cylinder 33 the core may be rotated and with it a lock bar 38 preferably a flat metal strip, which when rotated, as illustrated in Fig. 4 will engage the underside of the latch bar 30 to raise the same, thus also raising the dog 24 and maintaining the same out of engagement with the ratchet teeth. Thus the device may be locked in inoperative position when desired.

Inasmuch as the device tends to normally close the doors, it is desirable and necessary that means be employed for securing the doors in open position and to this end, we preferably employ the releasable door securing means substantially as illustrated in our Patent No. 1,452,014 granted to us April 17th, 1923. Referring particularly to Figs. 12 and 13 it will be noted that in this present instance, the releasable door securing means is illustrated as being enclosed in a casing 39 having on its outer side a hook 40 adapted to engage a keeper 41 secured either to the floor or to the wall adjacent the door in open position. A solenoid 42 is arranged within the casing 39, the movable core 43 of which is adapted to maintain a latch 44 in operative position to engage a hook latch 45, carried by the hook 40. While the solenoid 42 is energized the hook member 40 which is pivoted to the casing as at 46 will be maintained in position to engage the chain 47 to thus hold the door in its open position. When, however, the solenoid 42 is de-energized its core will drop thus releasing the hook member 40 which in turn becomes disengaged from the chain 47 to release the door.

It is desirable to provide a plurality of circuit controlling devices arranged at strategical points throughout the building so that door closing and locking devices may be actuated from any of these points. In many instances the circuit to a relay circuit breaker, yet to be described, will be closed by the use of ordinary circuit closers of the push-button type. However, in places such for instance as the cashier's cage or the like it is often found desirable to provide means such as a foot rest bar so positioned as to be conveniently actuated by the cashier without any appreciable or noticeable movement or action on his part. Therefore, we have provided a circuit closing device which consists of a foot rest in the form of a bar 48 supported by a pair of brackets 49 pivoted as at 50 to a pair of standards or uprights 51 preferably secured to the floor. Under ordinary circumstances the bar 48 will be depressed by the feet of the cashier but when it is desired to close the circuit to the relay circuit breaker, this may be accomplished by raising the bar 48. For this purpose one of the standards 51 is provided preferably with a hollow enlargement 52 in which there is arranged a push-button contact 53 adapted to be closed by a shoe 54 arranged on the end of a rod 55 displaceable by a projection 56 projecting from the bracket 59. Obviously, therefore if the bar 48 is swung upwardly the push-button contacts will be closed thus completing the circuit through the relay circuit breaker.

The relay device consists of a pair of magnets 56 adapted to influence the pivoted latch keeper 57 provided with an offset 58 adapted to engage under a lug 59 projecting laterally from an arm 60 pivoted as at 61 to the supporting frame 62 of the relay device. A weight 63 tends to normally swing the arm 60 about its pivot 61 in a downward direction, this movement being normally restricted by engagement of the projection 58 under the lug 59. Obviously, when the magnets 56 of the relay device are energized the latch 57 will be drawn toward the magnet to release the arm 60.

By referring particularly to Fig. 15 it will be noted that the arm 60 carries a contact point 64 adapted to engage either the contact 65 or a contact 66. The contact 66 is in circuit by means of a wire 67 with a plurality of alarm devices in the form of bells 68. The source of current 69 has a wire 70 leading therefrom which in turn is connected by branch wires 71 to the several alarm devices 68. In this figure, the solenoids 27 of several door locking devices are illustrated as well as the solenoids 42 of the several door releasing mechanisms. These solenoids 27 and 42 are all connected in parallel, branch wires 72 being provided which connect with a wire 73 connected to the contact 65. A wire 74 leads from the other side of the source of current 69 and completes a closed circuit to the solenoids 27 and 42. Circuit closing devices such as the foot actuated type illustrated in Figs. 9 to 11 or the usual commercial push-button type are illustrated as at 75, a plurality of these being situated, as mentioned hereinbefore at any desired point.

Normally the circuit is closed from the source of current around through the solenoids 27 and 42 through the contact 65, arm 60 to the frame of the relay circuit breaker and thence through wires 74 to the source of current. This normally closed circuit maintains the solenoids 27 and 42 energized. If, however, any circuit closing device 75 is actuated, a second circuit is closed energizing the magnets 56 which actuates the latch keeper 57 releasing the arm 60 permitting the weight 63 to move its arm to its lowermost position whereupon it engages contact 66 and completes the circuit through the alarm devices 68. The movement of the arm 60 has moved the contact 64 from the contact 65 whereupon the circuit to the solenoids 27 and 42 is broken, the door releasing devices release the doors and the door locking devices are actuated to cause the dogs to engage the ratchet teeth of the pulley members. Obviously, the arm 60 will remain in its lowermost position thus keeping closed the circuit to the alarm devices which will continue to function until the device has been reset.

Obviously with the structural arrangement herein described it is possible to reverse the position of the pulley members so that the ratchet teeth thereof will effectively prevent the opening of a door swinging in either direction so that a pair of similarly constructed members 12 may be positioned to close and lock a pair of swinging doors. The mechanism in the devices is suitably enclosed so that the same is not unsightly and will not mar the attractiveness of the building in which it is used.

Obvious modifications will suggest themselves to those skilled in this art and for this reason, reservation is made to make such changes in the details of construction as may come within the purview of the accompanying claims.

Having thus described the invention, what we claim is:

1. The combination with a door of a door closing and locking arrangement comprising a spring influenced pulley member, flexible means connecting said door to said pulley member, means for locking said pulley to prevent the opening of said door, means for holding said door open, and electrically controlled means for simultaneously releasing said door holding means, and actuating said pulley locking means from a distant point.

2. The combination with a door of a closing and locking device comprising a casing, a pulley member mounted within said casing, flexible means connecting said door to said pulley member, a series of ratchet teeth arranged on each face of said pulley member, the teeth of one face being operative in the reverse direction from those of the other face, means for engaging the teeth of one series for preventing rotation of said pulley member in one direction, said pulley member being reversible to present the other series of teeth to said engaging means, to prevent rotation of said pulley in the opposite direction.

3. The combination with a door and a door frame of a door closing and locking device comprising a casing mounted upon the door frame, a pulley member rotatably mounted within the casing, flexible means secured to said pulley and said door, ratchet teeth formed on said pulley member, a gravity actuated dog for engaging said ratchet teeth and solenoid controlled means for normally holding said dog in inoperative position.

4. The combination with a door and door frame of a door closing and locking device comprising a pulley member, flexible means connecting said pulley member to said door, a casing for supporting said pulley member mounted on said frame, said pulley member being reversibly mounted in said casing, a series of ratchet teeth formed on each face of said pulley, the teeth of one series being operative in the reverse direction from those of the other series, a dog mounted within said casing for engaging one series of ratchet teeth to prevent rotation of the pulley in one direction and solenoid means for normally holding said dog in inoperative position, the mounting for the dog being so constructed that the dog may be reversed to engage the other series of ratchet teeth when the pulley is reversed to prevent rotation of the pulley in the opposite direction, whereby said device may be associated with doors moving in opposite directions.

5. The combination with a door and door frame of a door closing and locking means comprising a pulley mounted on said frame, a flexible member connecting said pulley to said door, a spring tending to rotate said pulley to wind said flexible member on said pulley and pull said door closed, means for locking said pulley to prevent the door from opening and means for controlling said pulley locking means from a distant point.

The foregoing specification signed at New York, N. Y., this 25th day of June, 1923.

CLINTON L. WOLFE.
JOSEPH A. FAUROT.